(12) United States Patent  
Kuhara et al.

(10) Patent No.: US 11,247,786 B2
(45) Date of Patent: Feb. 15, 2022

(54) LIGHT EMISSION CONTROL APPARATUS, DRONE, AND METHOD FOR CONTROLLING EMISSION OF LIGHT

(71) Applicant: PANASONIC INTELLECTUAL PROPERTY CORPORATION OF AMERICA, Torrance, CA (US)

(72) Inventors: Shunsuke Kuhara, Osaka (JP); Takenobu Aoshima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 80 days.

(21) Appl. No.: 16/738,593

(22) Filed: Jan. 9, 2020

(65) Prior Publication Data

US 2020/0148386 A1 May 14, 2020

Related U.S. Application Data

(62) Division of application No. 15/423,946, filed on Feb. 3, 2017, now Pat. No. 10,569,901.

(60) Provisional application No. 62/295,674, filed on Feb. 16, 2016.

(30) Foreign Application Priority Data

Sep. 27, 2016 (JP) .................................. 2016-187688

(51) Int. Cl.
*B64D 47/02* (2006.01)
*B64C 39/02* (2006.01)
*G05D 1/00* (2006.01)
*H05B 45/00* (2020.01)
*H05B 47/105* (2020.01)

(52) U.S. Cl.
CPC ............ *B64D 47/02* (2013.01); *B64C 39/024* (2013.01); *G05D 1/0033* (2013.01); *G05D 1/0094* (2013.01); *H05B 47/105* (2020.01); *B64C 2201/024* (2013.01); *B64C 2201/027* (2013.01); *B64C 2201/12* (2013.01); *B64C 2201/146* (2013.01); *B64D 2203/00* (2013.01); *H05B 45/00* (2020.01)

(58) Field of Classification Search
CPC .. B64D 2203/00; G01S 17/06; H05B 37/0227
See application file for complete search history.

(56) References Cited

U.S. PATENT DOCUMENTS

| | | |
|---|---|---|
| 9,739,870 B1 | 8/2017 | Beckman et al. |
| 9,984,579 B1 | 5/2018 | Harris et al. |
| 2008/0086236 A1 | 4/2008 | Saito et al. |

(Continued)

FOREIGN PATENT DOCUMENTS

| | | |
|---|---|---|
| GB | 2529442 | 2/2016 |
| JP | 63-302694 | 12/1998 |
| JP | 2008-072474 A | 3/2008 |

*Primary Examiner* — Peter D Nolan
*Assistant Examiner* — Ce Li Li
(74) *Attorney, Agent, or Firm* — Greenblum & Bernstein, P.L.C.

(57) ABSTRACT

A drone includes a light emitter that emits light and circuitry which, in operation, obtains flight state information regarding a flight state of the drone, determines, on the basis of the flight state information, a direction in which the light emitter is to emit light, and controls the light emitter such that the light emitter emits light in the determined direction.

3 Claims, 14 Drawing Sheets

(56) References Cited

U.S. PATENT DOCUMENTS

| | | | |
|---|---|---|---|
| 2015/0254988 A1 | 9/2015 | Wang et al. | |
| 2016/0030819 A1* | 2/2016 | Ahn | A63B 69/3623 473/192 |
| 2016/0306071 A1 | 10/2016 | Iranpour et al. | |
| 2017/0221394 A1* | 8/2017 | Garcia Morchon | G03B 21/608 |

* cited by examiner

LIGHT EMISSION CONTROL APPARATUS, DRONE, AND METHOD FOR CONTROLLING EMISSION OF LIGHT

This is a divisional application of U.S. patent application Ser. No. 15/423,946, filed Feb. 3, 2017, which claims the benefit of Provisional Application No. 62/295,674, filed on Feb. 16, 2016; and claims the benefit of Japanese Patent Application No. 2016-187688, filed on Sep. 27, 2016. The entire disclosure of each of the above-identified applications, including the specification, drawings, and claims, is incorporated herein by reference in its entirety.

BACKGROUND

1. Technical Field

The present disclosure relates to a light emission control apparatus that controls a light emission unit used in a drone that flies in accordance with remote control performed using a controller, the drone including the light emission control apparatus, and a method for controlling emission of light in which the light emission unit is controlled.

2. Description of the Related Art

During these years, small drones remotely controlled by controllers are gaining in popularity. Such a drone includes propellers and is capable of freely flying through the air by controlling propeller speeds.

Since drones can freely fly through the air, various regulations on the flight of drones are being examined. For example, a regulation that allows a drone to fly only within an area in which an operator can visually observe the flight of the drone is being examined.

As a method that complies with such a regulation, for example, Japanese Unexamined Patent Application Publication No. 63-302694 discloses a telescope wireless control apparatus that includes a telescope and a wireless control apparatus that is arranged on a body or a mount of the telescope and that is used for controlling a wirelessly controlled flying vehicle.

SUMMARY

In the above example of the related art, however, an operator can control a drone within a certain distance while visually observing the drone, but if the drone is located far from a controller, it is difficult for the operator to visually observe and operate the drone. Further improvements, therefore, are needed.

One non-limiting and exemplary embodiment provides a light emission control apparatus, a drone, and a method for controlling emission of light that enable an operator to visually observe a flight state of the drone even if the drone is located far from the operator.

In one general aspect, the techniques disclosed here feature an apparatus including one or a plurality of memories and circuitry which, in operation, obtains flight state information regarding a flight state of a drone that flies in accordance with remote control performed using a controller, the drone being provided with a light emitter, determines, on the basis of the flight state information, a direction in which the light emitter emits light, and controls the light emitter such that the light emitter emits light in the determined direction.

According to the present disclosure, an operator can visually observe a flight state of a drone even if the drone is located far from the operator.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
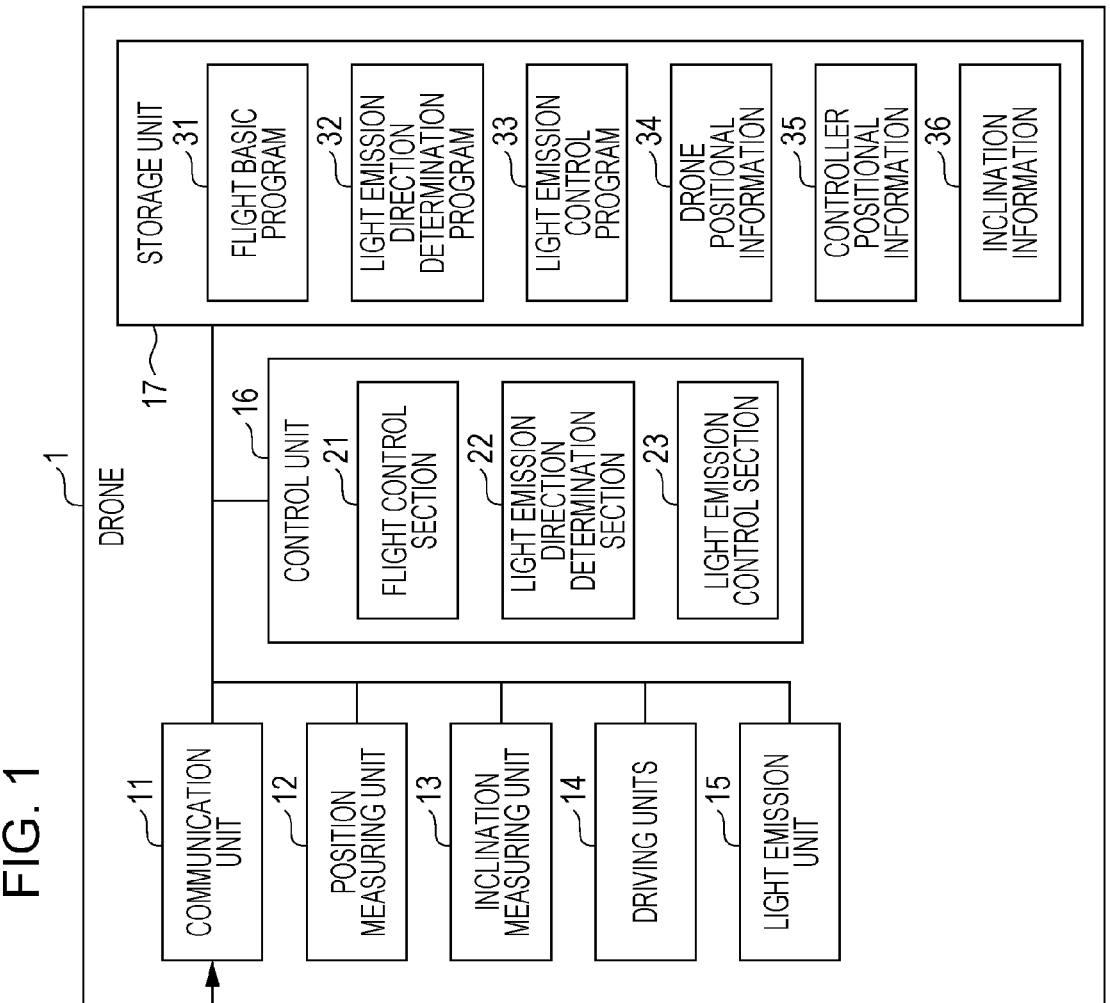
FIG. 1 is a block diagram illustrating an example of the configuration of a light emission control system according to a first embodiment of the present disclosure.

Underlying Knowledge Forming Basis of Present Disclosure

As described above, if a drone is located far from a controller, it is difficult for an operator to visually observe and operate the drone. It is especially difficult to visually observe a flight state of a drone at night if the drone is located far from the controller.

The present inventors have conceived aspects of the present disclosure on the basis of the above examination.

An apparatus according to an aspect of the present disclosure is an apparatus including one or a plurality of memories and circuitry which, in operation, obtains flight state information regarding a flight state of a drone that flies in accordance with remote control performed using a controller, the drone being provided with a light emitter, determines, on the basis of the flight state information, a direction in which the light emitter emits light, and controls the light emitter such that the light emitter emits light in the determined direction.

With this configuration, flight state information regarding a flight state of a drone is obtained, a direction in which a light emitter emits light is determined on the basis of the obtained flight state information, and the light emitter is controlled in such a way as to emit light in the determined direction. The light emitter, therefore, can emit light in the direction according to the flight state of the drone, and an operator can visually observe the flight state of the drone even if the drone is located far from the operator.

The light emitter may include a laser light emitter that emits laser light. The circuitry may control the laser light emitter such that the laser light emitter emits laser light in the determined direction.

With this configuration, the laser light emitter of the drone can emit laser light in the direction according to the flight state of the drone, and the operator can visually observe the drone more easily.

The circuitry may obtain controller positional information indicating a current position of the controller and drone positional information indicating a current position of the drone and determine, on the basis of the controller positional information and the drone positional information, a controller direction, which is a direction from the drone to the controller, as the direction in which the light emitter emits light.

With this configuration, controller positional information indicating a current position of the controller and drone positional information indicating a current position of the drone are obtained, a controller direction, which is a direction from the drone to the controller, is determined, on the basis of the obtained controller positional information and drone positional information, as the direction in which the light emitter emits light, and the light emitter is controlled in such a way as to emit light in the determined controller direction. The light emitter, therefore, can emit light toward the operator, and the operator can easily visually observe the flight state of the drone.

The circuitry may obtain inclination information indicating an inclination of the drone and determine the controller direction on the basis of the controller positional information and the drone positional information.

With this configuration, inclination information indicating an inclination of the drone is obtained, and the controller direction is determined on the basis of the inclination information as well as the controller positional information and the drone positional information. The controller direction, therefore, can be more accurately determined, and the light emitter can more accurately emit light toward the operator.

The circuitry may calculate, on the basis of the controller positional information and the drone positional information, a distance between the drone and the controller and control the light emitter such that the light emitter emits light only if the distance between the drone and the controller exceeds a certain value.

With this configuration, a distance between the drone and the controller is calculated on the basis of the controller positional information and the drone positional information, and the light emitter is controlled in such a way as to emit light only if the distance between the drone and the controller exceeds a certain value. The light emitter, therefore, emits light only if the drone is located so far from the operator that it is difficult for the operator to visually observe the drone, and power consumption due to the emission of light performed by the light emitter can be suppressed.

The circuitry may determine, on the basis of the controller positional information and the drone positional information, which way the drone is moving relative to the controller and control the light emitter such that the light emitter emits light differently between when the drone is moving toward the controller and when the drone is moving away from the controller.

With this configuration, which way the drone is moving relative to the controller is determined on the basis of the controller positional information and the drone positional information, and the light emitter is controlled in such a way as to emit light differently between when the drone is moving toward the controller and when the drone is moving away from the controller. The operator, therefore, can easily understand whether the drone is moving toward or away from the controller.

The drone may be moving into a first area, which corresponds to directions in which the drone is moving toward the controller, a second area, which corresponds to directions in which the drone is moving away from the controller, or a third area, which is an area other than the first and second areas. The circuitry may control the light emitter such that the light emitter emits light differently between when the drone is moving into the first area, when the drone is moving into the second area, and when the drone is moving into the third area.

With this configuration, the light emitter is controlled in such a way as to emit light differently between when the drone is moving toward the controller, when the drone is moving away from the controller, and when the drone is moving in other directions. The operator, therefore, can easily understand whether the drone is moving toward the controller, the drone is moving away from the controller, or the drone is moving in another direction.

The circuitry may calculate a distance between the drone and the controller on the basis of the controller positional information and the drone positional information and control the light emitter such that the light emitter emits light differently depending on the distance between the drone and the controller.

With this configuration, a distance between the drone and the controller is calculated on the basis of the controller positional information and the drone positional information, and the light emitter is controlled in such a way as to emit light differently depending on the distance between the drone and the controller. The operator, therefore, can easily understand the distance between the operator and the drone as well as whether the drone is moving toward or away from the controller.

The circuitry may obtain wind direction information indicating a wind direction around the drone and determine the wind direction around the drone as the direction in which the light emitter emits light.

With this configuration, wind direction information indicating a wind direction around the drone is obtained, the wind direction around the drone indicated by the obtained wind direction information is determined as the direction in which the light emitter emits light, and the light emitter is controlled in such a way as to emit light in the determined wind direction. The operator, therefore, can easily understand the wind direction around the drone.

The circuitry may obtain instruction information for instructing the light emitter to emit light in a direction of a central axis of the drone during flight and determine, on the basis of the instruction information, an upward direction of the central axis as the direction in which the light emitter emits light.

With this configuration, instruction information for instructing the light emitter to emit light in a direction of a central axis of the drone during flight is obtained, an upward direction of the central axis of the drone is determined, on the basis of the instruction information, as the direction in which the light emitter emits light, and the light emitter is controlled in such a way as to emit light in the determined upward direction of the central axis of the drone. The operator, therefore, can easily check, on the basis of the direction of light emitted from the light emitter, which way and how much the drone is inclined and easily understand how the flight of the drone is being affected by wind.

The light emitter may include a first light emitter and a second light emitter. The circuitry may obtain gravity information indicating a direction of gravity upon the drone, determine, on the basis of the instruction information, the upward direction of the central axis as a direction in which the first light emitter emits light and the direction of gravity indicated by the gravity information as a direction in which the second light emitter emits light, and control the first and second light emitters such that the first light emitter emits light in the upward direction of the central axis and the second light emitter emits light in the direction of gravity.

With this configuration, gravity information indicating a direction of gravity upon the drone is obtained, the upward direction of the central axis of the drone is determined, on the basis of the instruction information, as a direction in which the first light emitter emits light and the direction of gravity indicated by the gravity information as a direction in which the second light emitter emits light, and the first and second light emitters are controlled such that the first light emitter emits light in the upward direction of the central axis of the drone and the second light emitter emits light in the direction of gravity. The operator, therefore, can easily check, on the basis of whether the direction of light emitted from the first light emitter and the direction of light emitted from the second light emitter match, can more easily check which way and how much the drone is inclined, and more easily understand how the flight of the drone is being affected by wind.

A drone according to another aspect of the present disclosure is a drone including a light emitter and circuitry which, in operation, obtains flight state information regarding a flight state of the drone, determines, on the basis of the flight state information, a direction in which the light emitter emits light, and controls the light emitter such that the light emitter emits light in the determined direction. In this case, too, the same effects as those produced by the apparatus can be produced.

The present disclosure can be implemented not only as the apparatus and the drone having the above-described characteristic configurations but also as a method for performing a characteristic process corresponding to the characteristic configurations of the apparatus and the drone. The same effects as those produced by the apparatus or the drone, therefore, can also be produced by the following aspect.

A method according to another aspect of the present disclosure is a method including obtaining flight state information regarding a flight state of a drone that flies in accordance with remote control performed using a controller, the drone being provided with a light emitter, determining, on the basis of the flight state information, a direction in which the light emitter emits light, and controlling the light emitter such that the light emitter emits light in the determined direction.

Embodiments of the present disclosure will be described hereinafter with reference to the drawings. The following embodiments are specific examples of the present disclosure. Shapes, components, steps, the order of the steps, and the like mentioned in the following embodiments are examples, and do not limit the present disclosure.

Among the components described in the following embodiments, ones not described in the independent claims, which define broadest concepts, will be described as arbitrary components. The embodiments may be combined with one another. Various modifications obtained by modifying the embodiments of the present disclosure in various ways conceived by those skilled in the art, too, are included in the present disclosure insofar as the scope of the present disclosure is not deviated from.

First Embodiment

Figure 2:
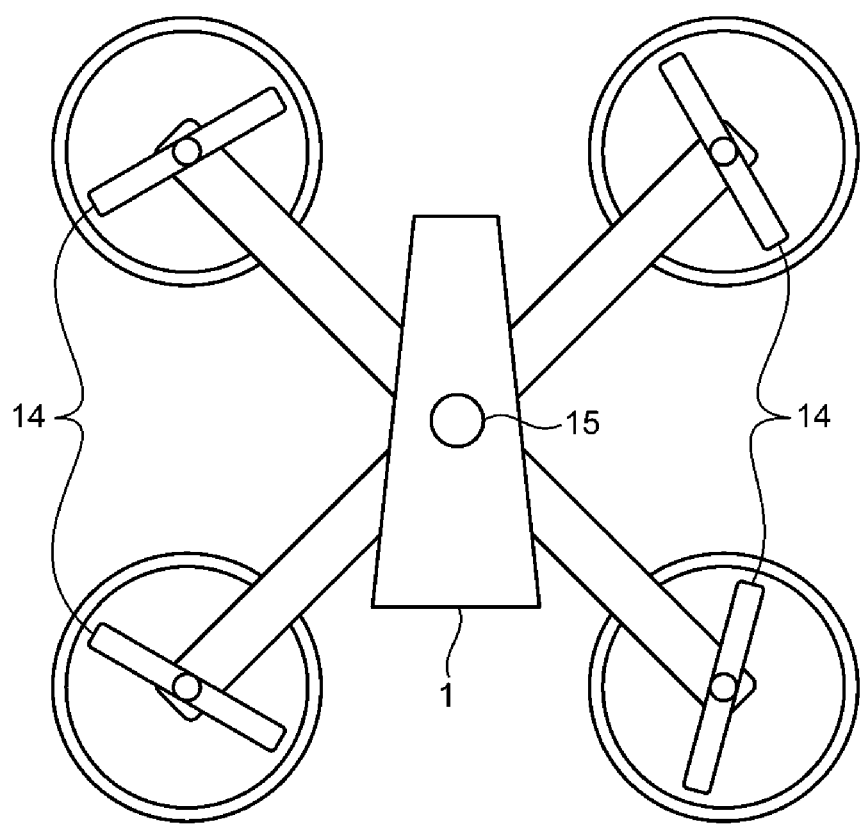
FIG. 2 is a diagram illustrating an example of the appearance of a drone illustrated in FIG. 1.

FIG. 1 is a block diagram illustrating an example of the configuration of a light emission control system according to a first embodiment of the present disclosure. FIG. 2 is a diagram illustrating an example of the appearance of a drone illustrated in FIG. 1.

The light emission control system illustrated in FIG. 1 includes a drone 1 and a controller 2. The controller 2 includes a communication unit 41, a position measuring unit 42, an input unit 43, a control unit 44, a storage unit 45, and a display unit 46.

The controller 2, which is operated by an operator who holds the controller 2 with both hands, is used for remotely controlling the drone 1. The controller 2, for example, wirelessly transmits an operation command or the like for operating the drone 1. More specifically, the communication unit 41 of the controller 2 transmits various pieces of information to a communication unit 11 of the drone 1 and receives various pieces of information from the communication unit 11.

The position measuring unit 42 is, for example, a global positioning system (GPS) receiver and regularly obtains controller positional information, which indicates a current position of the controller 2. The controller positional information is, for example, represented by latitude, longitude, and height. The communication unit 41 transmits, to the drone 1, the controller positional information, which indicates the current position of the controller 2, obtained by the position measuring unit 42.

The input unit 43 includes a left stick provided on the operator's left hand side and a right stick provided on the operator's right hand side. When the operator operates the left and right sticks, the input unit 43 outputs, to the communication unit 41, angle information regarding inclination angles of the left and right sticks. The drone 1 moves in accordance with the inclination angles. An operation command includes, for example, angle information indicating inclination angles of the left and right sticks.

The control unit 44 is, for example, a central processing unit (CPU) and controls various operations of the controller 2. The storage unit 45 is, for example, a semiconductor memory and stores various pieces of information necessary for the operator to operate the controller 2. The display unit 46 displays various pieces of information necessary for the operator to operate the controller 2.

The configuration of the controller 2 is not particularly limited to the above example. For example, a certain remote control program may be installed on a smartphone, a tablet computer, a person computer, or the like, an operation screen may be displayed on a touch panel or the like, and the operator may operate the controller 2 using the touch panel or the like, instead.

The drone 1 receives an operation command from the controller 2 and flies on the basis of the received operation command. The drone 1 can autonomously fly as necessary.

The drone 1 includes the communication unit 11, a position measuring unit 12, an inclination measuring unit 13, driving units 14, a light emission unit 15, a control unit 16, and a storage unit 17. As illustrated in FIG. 2, the drone 1 is provided with the driving units 14 and the light emission unit 15 illustrated in FIG. 1, and the communication unit 11, the position measuring unit 12, the inclination measuring unit 13, the control unit 16, and the storage unit 17 illustrated in FIG. 1 are included inside the drone 1.

The communication unit 11 transmits various pieces of information to the communication unit 41 of the controller 2 and receives various pieces of information from the communication unit 41. The communication unit 11 receives controller positional information from the controller 2 as flight state information regarding a flight state of the drone 1 and stores the controller positional information in the storage unit 17 as controller positional information 35.

The position measuring unit 12 is, for example, a GPS receiver and regularly obtains drone positional information, which indicates a current position of the drone 1, as flight state information regarding the flight state of the drone 1. The drone positional information is represented by latitude, longitude, and height. The position measuring unit 12 stores the obtained drone positional information in the storage unit 17 as drone positional information 34.

The inclination measuring unit 13 is, for example, an angular rate sensor such as a gyro sensor. The inclination measuring unit 13 regularly obtains inclination information, which indicates the inclination of the drone 1 during flight relative to a horizontal state, and stores the inclination information in the storage unit 17 as inclination information 36. When a light emission direction determination section 22 does not use inclination information, the inclination measuring unit 13 may be omitted.

The driving units 14 each include a propeller that obtains lift, thrust, and torque for flying the drone 1, a motor that rotates the propeller, and a driving circuit that drives the motor. The driving units 14 each rotate the propeller to fly the drone 1. As illustrated in FIG. 2, the drone 1 includes four driving units 14, but in FIG. 1, the four driving units 14 are illustrated in a single block for the sake of simplicity. The number of driving units 14 is not limited to this example. For example, the number of driving units 14 may be five or more, instead.

The light emission unit 15 includes, for example, a light-emitting device that emits light and a movement mechanism capable of changing a direction in which the light-emitting device emits light to an arbitrary direction and arbitrarily changes the direction in which the light emission unit 15 emits light. In the present embodiment, for example, a laser light emission unit that emits laser light and is capable of changing a direction in which the laser light emission unit emits laser light is used as the light emission unit 15. The configuration of the light emission unit 15 is not particularly limited to the above example. The light emission unit 15 may emit light other than laser light, instead. The light emission unit 15 may select a desired one of a plurality of light-emitting devices that emit light in certain directions and cause the light-emitting device to emit light, instead.

The control unit 16 is, for example, a CPU and controls various operations of the drone 1. The control unit 16 includes a flight control section 21, the light emission direction determination section 22, and a light emission control section 23.

The flight control section 21 executes a flight basic program 31 stored in the storage unit 17 to control the driving units 14 in accordance with an operation command obtained from the controller 2 through the communication unit 11 and control the flight state of the drone 1.

The light emission direction determination section 22 executes a light emission direction determination program 32 stored in the storage unit 17 to calculate a distance between the drone 1 and the controller 2 on the basis of the drone positional information 34 and the controller positional information 35 stored in the storage unit 17 and determines whether the calculated distance exceeds a certain value (e.g., 50 m or 100 m)

If the distance between the drone 1 and the controller 2 calculated by executing the light emission direction determination program 32 stored in the storage unit 17 exceeds the certain value, the light emission direction determination section 22 determines a controller direction, which is a direction from the drone 1 to the controller 2, as the direction in which the light emission unit 15 emits laser light on the basis of the drone positional information 34, the controller positional information 35, and the inclination information 36 stored in the storage unit 17 and transmits the controller direction to the light emission control section 23.

More specifically, the light emission direction determination section 22 determines the controller direction from the drone positional information 34 and the controller positional information 35, obtains the inclination of the drone 1 relative to the horizontal state from the inclination information 36, corrects the controller direction on the basis of the obtained inclination, and transmits the corrected controller direction to the light emission control section 23. When the inclination measuring unit 13 is omitted, the light emission direction determination section 22 may simply determine the controller direction on the basis of the drone positional information 34 and the controller positional information 35, instead.

If the distance between the drone 1 and the controller 2 exceeds the certain value, the light emission control section 23 executes a light emission control program 33 stored in the storage unit 17 to control the light emission unit 15 such that the light emission unit 15 emits laser light in the controller direction determined by the light emission direction determination section 22. The light emission unit 15 emits laser light in the controller direction.

Although the light emission unit 15 emits laser light only if the distance between the drone 1 and the controller 2 exceeds the certain value in the above description in order to suppress power consumption due to the emission of laser light performed by the light emission unit 15, a timing at which the light emission unit 15 emits laser light is not particularly limited to this example. For example, the light emission direction determination section 22 may determine the controller direction without determining whether the distance between the drone 1 and the controller 2 exceeds the certain value, and the light emission control section 23 may control the light emission unit 15 such that the light emission unit 15 emits laser light in the controller direction. Because a minimum distance at which it becomes difficult to visually observe the drone 1 differs between individuals, the operator may set a desired value as the certain value using the input unit 43, instead. This holds true in other embodiments.

The storage unit 17 is, for example, a semiconductor memory and stores various pieces of information. The storage unit 17 stores the flight basic program 31, the light emission direction determination program 32, the light emission control program 33, the drone positional information 34, the controller positional information 35, and the inclination information 36.

Figure 3:
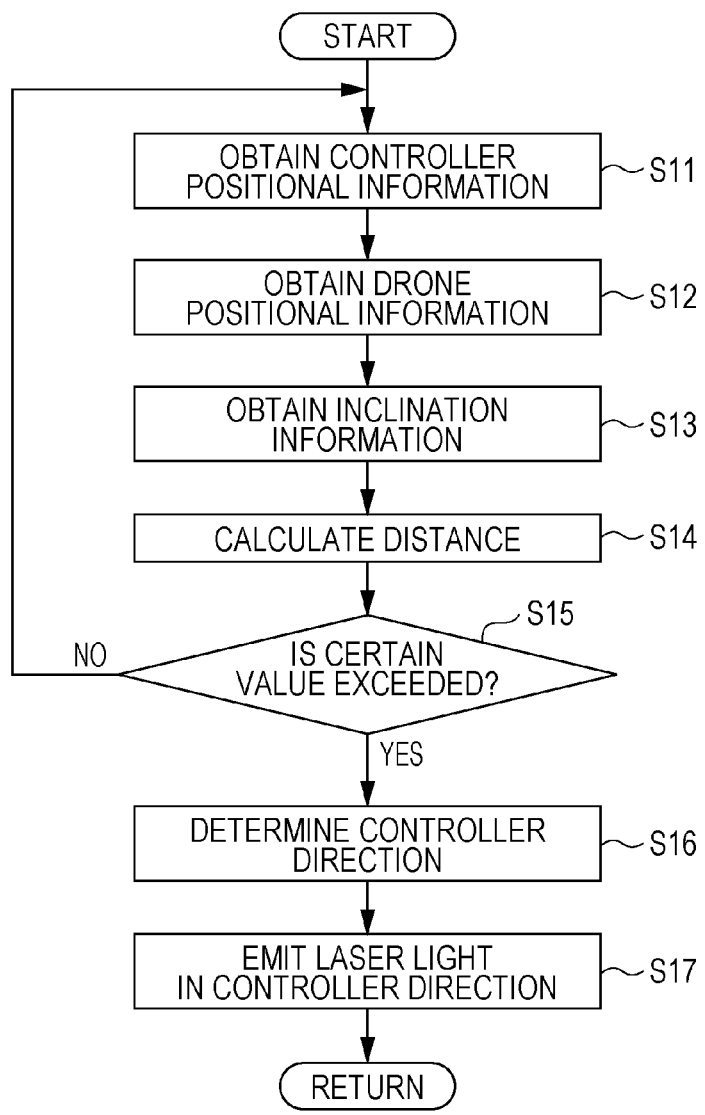
FIG. 3 is a flowchart illustrating an example of a process for controlling emission of light performed by the light emission control system illustrated in FIG. 1.

FIG. 3 is a flowchart illustrating an example of a process for controlling emission of light performed by the light emission control system illustrated in FIG. 1.

First, in step S11, the position measuring unit 42 of the controller 2 obtains controller positional information, which indicates the current position of the controller 2. The communication unit 41 transmits the controller positional information obtained by the position measuring unit 42 to the communication unit 11 of the drone 1. The communication unit 11 of the drone 1 receives the controller positional information and stores the controller positional information in the storage unit 17 as the controller positional information 35.

Next, in step S12, the position measuring unit 12 obtains drone positional information, which indicates the current position of the drone 1, and stores the obtained drone positional information as the drone positional information 34.

Next, in step S13, the inclination measuring unit 13 obtains inclination information, which indicates the inclination of the drone 1 during flight relative to the horizontal state and stores the inclination information in the storage unit 17 as the inclination information 36.

Next, in step S14, the light emission direction determination section 22 calculates the distance between the drone 1 and the controller 2 on the basis of the drone positional information 34 and the controller positional information 35 stored in the storage unit 17.

Next, in step S15, the light emission direction determination section 22 determines whether the calculated distance exceeds the certain value. If the distance between the drone 1 and the controller 2 does not exceed the certain value (NO in step S15), that is, if the distance is small enough for the operator to visually observe the drone 1, laser light need not be emitted toward the operator. The process, therefore, returns to step S11, and the subsequent processing is performed.

On the other hand, if the distance between the drone 1 and the controller 2 exceeds the certain value (YES in step S15), that is, if the distance is too large for the operator to visually observe the drone 1, the light emission direction determination section 22 determines, in step S16, the controller direction on the basis of the drone positional information 34, the controller positional information 35, and the inclination information 36 stored in the storage unit 17 and transmits the controller direction to the light emission control section 23.

Next, in step S17, the light emission control section 23 controls the light emission unit 15 such that the light emission unit 15 emits laser light in the controller direction determined by the light emission direction determination section 22. The light emission unit 15 emits laser light in the controller direction. The process then returns to step S11, and the subsequent processing is performed.

As a result of the process for controlling emission of light, in the present embodiment, the light emission unit 15 of the drone 1 emits laser light only if the drone 1 is located so far from the operator that it is difficult for the operator to visually observe the drone 1.

Figure 4:
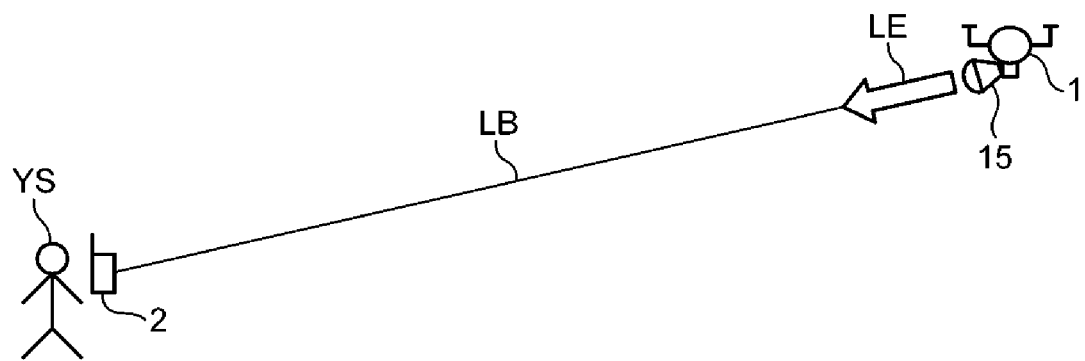
FIG. 4 is a schematic diagram illustrating an example of a use state of the light emission control system illustrated in FIG. 1.

FIG. 4 is a schematic diagram illustrating an example of a use state of the light emission control system illustrated in FIG. 1. As illustrated in FIG. 4, as a result of the process for controlling emission of light, the light emission unit 15 of the drone 1 emits laser light LB in a controller direction LE, which is a direction from the drone 1 to the controller 2, that is, an operator YS. In this case, the operator YS can easily visually observe the drone 1 even if visibility is poor due to fog, smoke, or the like.

As described above, in the present embodiment, the positional information regarding the controller 2 and the positional information regarding the drone 1 are obtained. In addition, the inclination information regarding the drone 1 is obtained. The controller direction, which is the direction from the drone 1 to the controller 2, is then determined, on the basis of the obtained positional information regarding the drone 1 and the controller 2 and the obtained inclination information regarding the drone 1, as the direction in which the light emission unit 15 emits laser light, and the light emission unit 15 is controlled in such a way as to emit light in the determined controller direction. The light emission unit 15 emits laser light toward the operator, and the operator can easily visually observe the current position of the drone 1.

In the present embodiment, the current position of the controller 2 is transmitted to the drone 1. The drone 1 identifies the controller direction, which is the direction from the drone 1 to the controller 2, on the basis of the current position of the controller 2 and the current position of the drone 1 and causes the light emission unit 15 to emit light in the identified controller direction. The process performed, however, is not limited to this example.

For example, the drone 1 may transmit the current position thereof to the controller 2. The controller 2 may identify a drone direction, which is a direction from the controller 2 to the drone 1, on the basis of the current position thereof and the current position of the drone 1, and a light emission unit of the controller 2 may emit light in the identified drone direction, instead.

Alternatively, the drone 1 may transmit the current position thereof to the controller 2. The controller 2 may identify the controller direction, which is the direction from the drone 1 to the controller 2, on the basis of the current position thereof and the current position of the drone 1 and transmit, to the drone 1, an instruction to control the light emission unit 15 such that the light emission unit 15 emits laser light in the identified controller direction. The light emission unit 15 of the drone 1 may emit laser light in the controller direction.

Alternatively, the light emission control system according to the present embodiment may include the drone 1, the controller 2, and a server that determines the direction in which the light emission unit 15 emits laser light.

For example, the server may be communicably connected to the drone 1 and the controller 2 through a certain network, identify the controller direction, which is the direction from the drone 1 to the controller 2, or the drone direction, which is the direction from the controller 2 to the drone 1, on the basis of the current position of the controller 2 transmitted from the controller 2 and the current position of the drone 1 transmitted from the drone 1, and transmit, to the drone 1 or the controller 2, an instruction to control the light emission unit 15 or the light emission unit of the controller 2 such that the light emission unit 15 or the light emission unit of the controller 2 emits laser light in the identified controller direction or the identified drone direction. The light emission unit 15 or the light emission unit of the controller 2 may emit laser light in the controller direction or the drone direction.

Alternatively, the information transmitted from the server may be received by the drone 1 through the controller 2, and the information transmitted from the drone 1 may be received by the server through the controller 2. These hold true in the other embodiment that will be described hereinafter.

Second Embodiment

Next, a light emission control system according to a second embodiment of the present disclosure will be described. When a drone is located far from a controller, the drone can be visually observed if the drone emits laser light toward the controller. It is difficult, however, to understand whether the drone is moving toward or away from the controller.

In the present embodiment, an operator is notified of whether a drone is moving toward or away from a controller on the basis of how the drone emits laser light, that is, on the basis of the color of the laser light or whether a light emission unit continuously or intermittently emits laser light.

Figure 5:
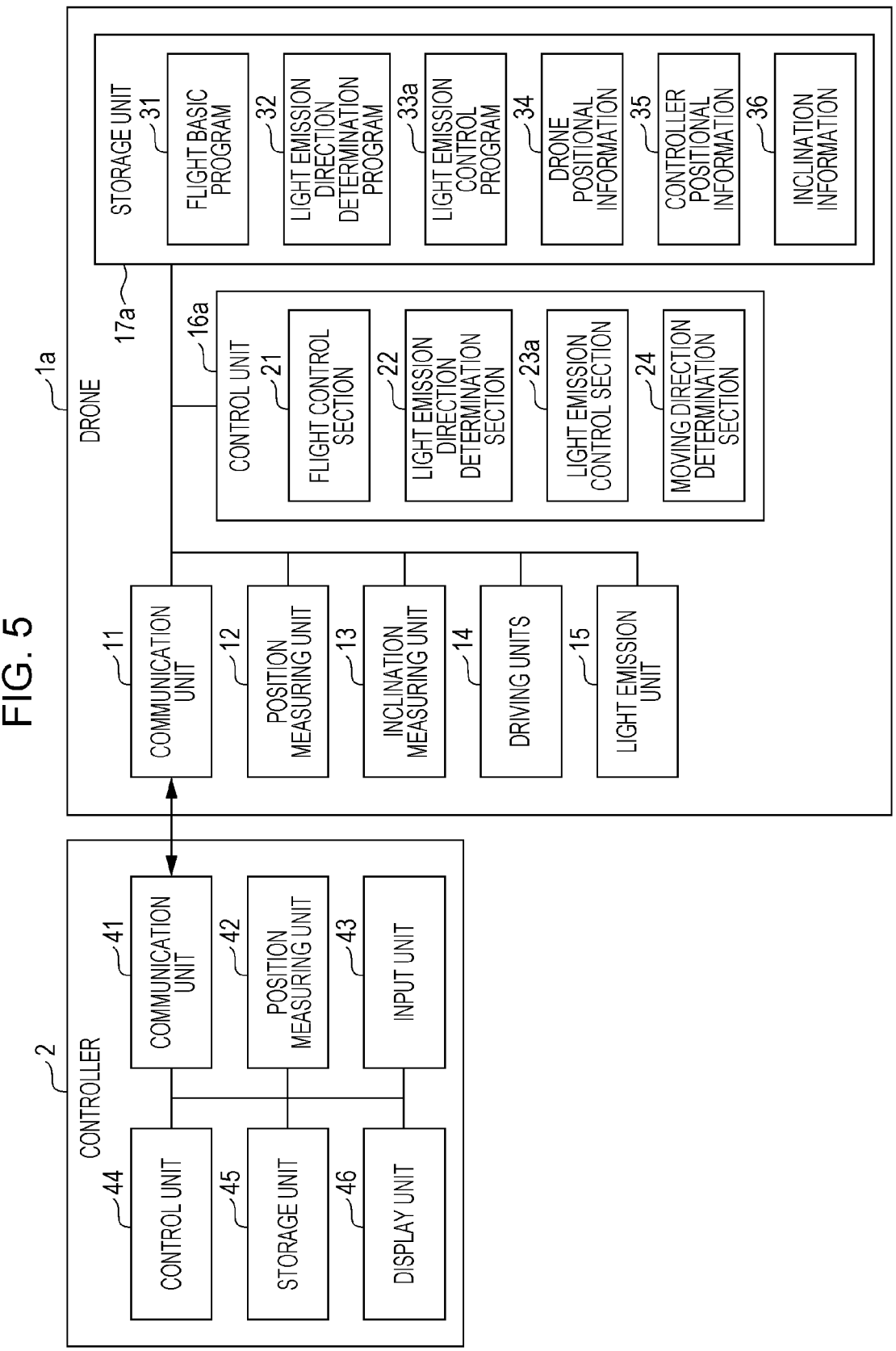
FIG. 5 is a block diagram illustrating an example of the configuration of a light emission control system according to a second embodiment of the present disclosure.

FIG. 5 is a block diagram illustrating an example of the configuration of the light emission control system according to the second embodiment of the present disclosure. The light emission control system illustrated in FIG. 5 includes a drone 1a and the controller 2. The drone 1a includes the communication unit 11, the position measuring unit 12, the inclination measuring unit 13, the driving units 14, the light emission unit 15, a control unit 16a, and a storage unit 17a. The control unit 16a includes the flight control section 21, the light emission direction determination section 22, a light emission control section 23a, and a moving direction determination section 24. The storage unit 17a stores the flight basic program 31, the light emission direction determination program 32, a light emission control program 33a, the drone positional information 34, the controller positional information 35, and the inclination information 36.

The light emission control system illustrated in FIG. 5 is different from the light emission control system illustrated in FIG. 1 in that the moving direction determination section 24 is added to the control unit 16a, the light emission control section 23 of the control unit 16 is replaced by the light emission control section 23a of the control unit 16a, and the light emission control program 33 stored in the storage unit 17 is replaced by the light emission control program 33a stored in the storage unit 17a. The other components are the same as those of the light emission control system illustrated in FIG. 1 and given the same reference numerals, and detailed description thereof is omitted.

The moving direction determination section 24 determines whether the drone 1a is moving toward or away from the controller 2 on the basis of the drone positional information 34 and the controller positional information 35 stored in the storage unit 17a, and outputs a result of the determination to the light emission control section 23a.

If a calculated distance between the drone 1a and the controller 2 exceeds a certain value, the light emission control section 23a executes the light emission control program 33a stored in the storage unit 17a to control, on the basis of the result of the determination made by the moving direction determination section 24, how the light emission unit 15 emits laser light in the controller direction determined by the light emission direction determination section 22.

The light emission unit 15 emits laser light differently between when the drone 1a is moving toward the controller 2 and when the drone 1a is moving away from the controller 2. For example, if the drone 1a is moving toward the controller 2, the light emission unit 15 continuously emits laser light, and if the drone 1a is moving away from the controller 2, the light emission unit 15 intermittently emits laser light. How the light emission unit 15 emits laser light is not limited to this example. The light emission unit 15 may emit light in various ways insofar as the operator can understand whether the drone 1a is moving toward or away from the controller 2.

Figure 6:
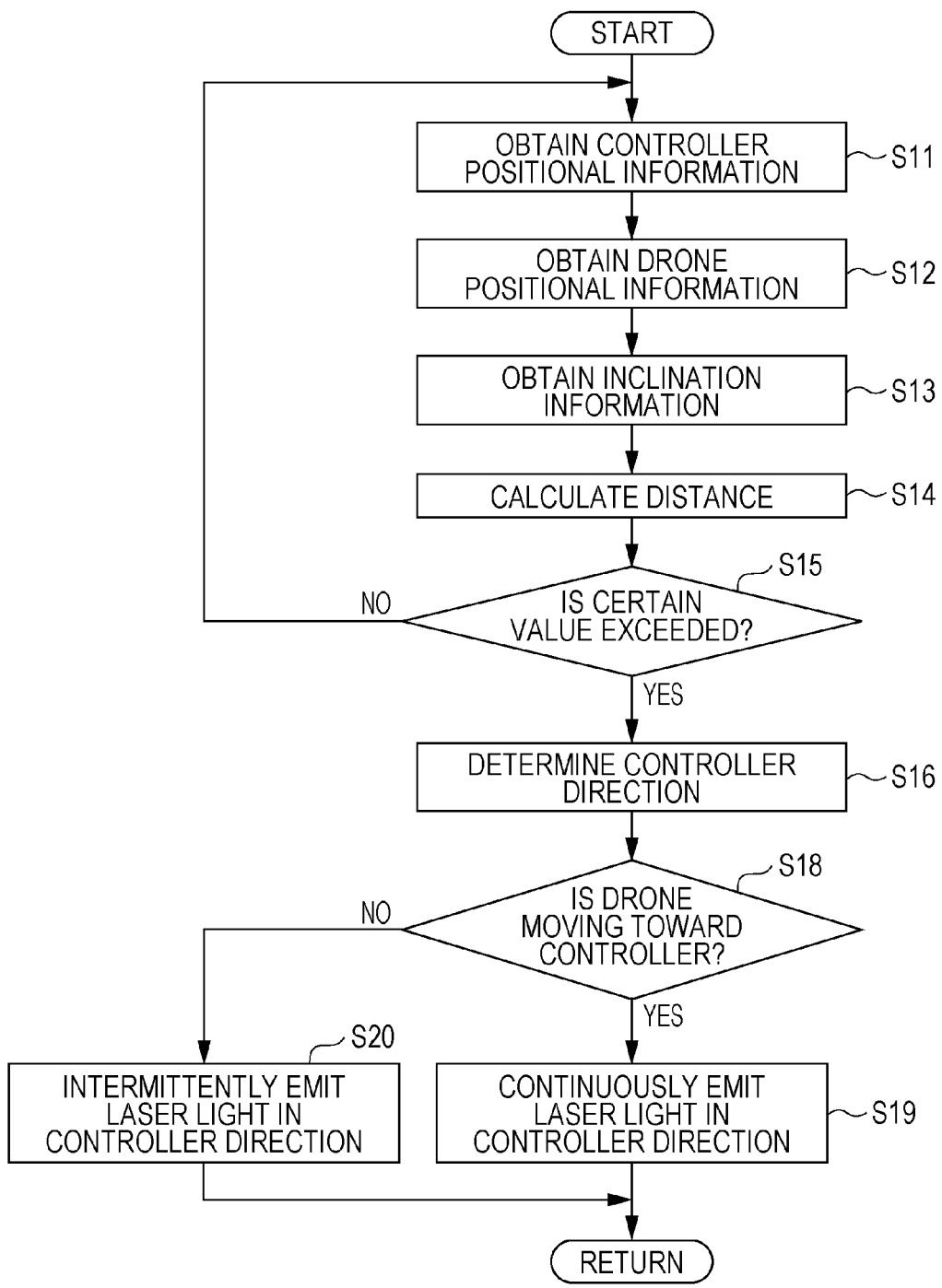
FIG. 6 is a flowchart illustrating an example of a process for controlling emission of light performed by the light emission control system illustrated in FIG. 5.

FIG. 6 is a flowchart illustrating an example of a process for controlling emission of light performed by the light emission control system illustrated in FIG. 5. Processing in steps S11 to S16 illustrated in FIG. 6 is the same as that in steps S11 to S16 illustrated in FIG. 3 and given the same reference numerals, and detailed description thereof is omitted.

After the processing in steps S11 to S16 is performed, the moving direction determination section 24 determines, in step S18, whether the drone 1a is moving toward or away from the controller 2 on the basis of the drone positional information 34 and the controller positional information 35 stored in the storage unit 17a, and outputs a result of the determination to the light emission control section 23a.

If the drone 1a is moving toward the controller 2 (YES in step S18), the process proceeds to step S19, and the light emission control section 23a controls the light emission unit 15 such that the light emission unit 15 emits laser light in the controller direction. The light emission unit 15 emits laser light in the controller direction. The process then returns to step S11, and the subsequent processing is performed.

On the other hand, if the drone 1a is moving away from the controller 2 (NO in step S18), the process proceeds to step S20, and the light emission control section 23a controls the light emission unit 15 such that the light emission unit 15 intermittently emits laser light in the controller direction. The light emission unit 15 intermittently emits laser light in the controller direction. The process then returns to step S11, and the subsequent processing is performed.

As a result of the process for controlling emission of light, in the present embodiment, the light emission unit 15 emits laser light differently depending on whether the drone 1a is moving toward or away from the controller 2 only if the drone 1a is located so far from the operator that it is difficult for the operator to visually observe the drone 1a.

Figure 7:
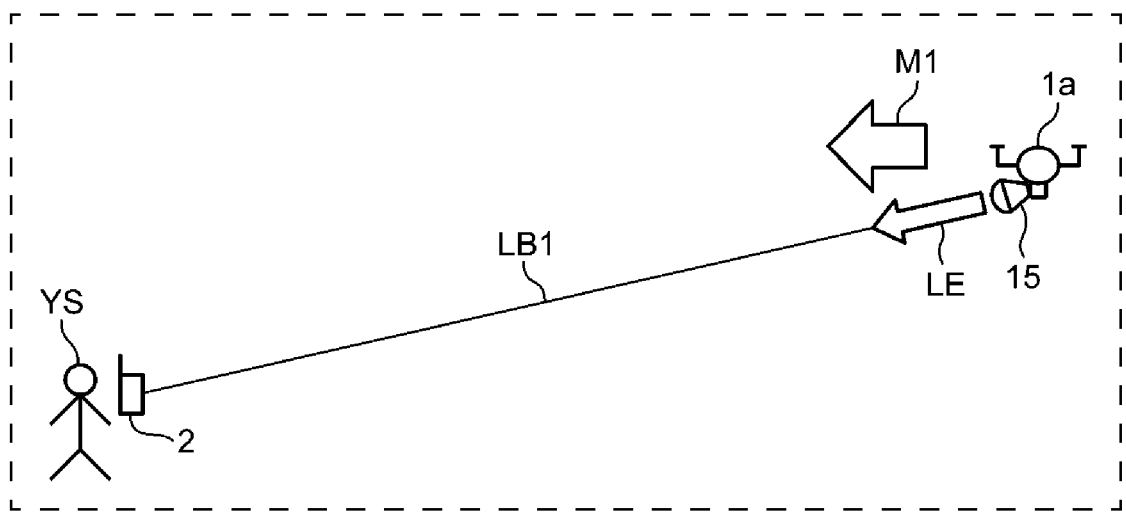
FIG. 7 is a schematic diagram illustrating an example of a use state of the light emission control system at a time when a drone illustrated in FIG. 5 is moving toward a controller.
Figure 8:
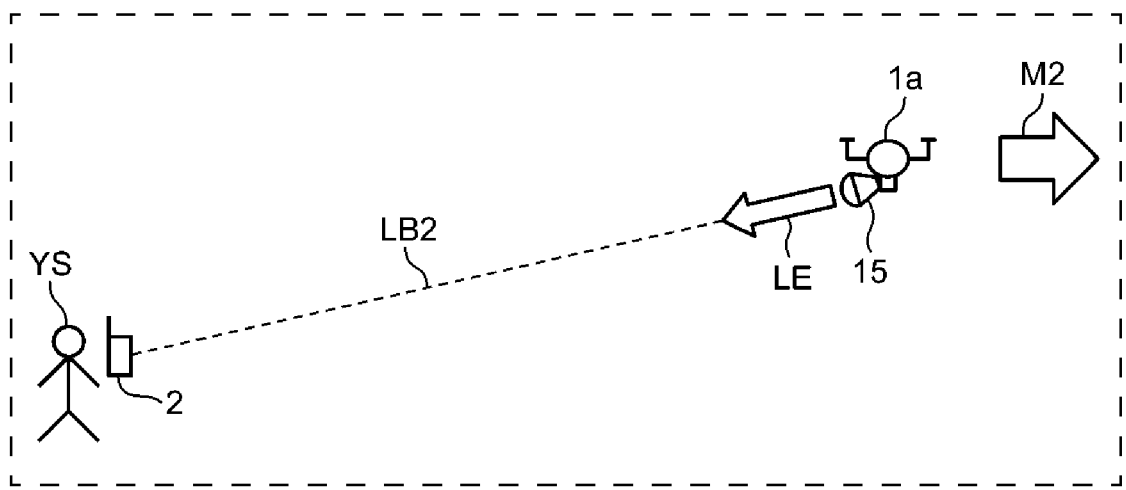
FIG. 8 is a schematic diagram illustrating an example of a use state of the light emission control system at a time when the drone illustrated in FIG. 5 is moving away from the controller.

FIG. 7 is a schematic diagram illustrating an example of a use state of the light emission control system at a time when the drone 1a illustrated in FIG. 5 is moving toward the controller 2. FIG. 8 is a schematic diagram illustrating an example of a use state of the light emission control system at a time when the drone 1a illustrated in FIG. 5 is moving away from the controller 2.

As illustrated in FIG. 7, if the drone 1a is moving toward the controller 2 in a direction M1, the light emission unit 15 of the drone 1a continuously emits, through the process for controlling emission of light, laser light LB1 in the controller direction LE, which is a direction from the drone 1a to the controller 2, that is, the operator YS. In this case, the operator YS can easily visually observe the drone 1a and understand that the drone 1a is moving toward the controller 2 even if visibility is poor due to fog, smoke, or the like.

On the other hand, as illustrated in FIG. 8, if the drone 1a is moving away from the controller 2 in a direction M2, the light emission unit 15 of the drone 1a intermittently emits, through the process for controlling emission of light, laser light LB2 in the controller direction LE, which is the direction from the drone 1a to the controller 2, that is, the operator YS. In this case, the operator YS can easily visually observe the drone 1a and understand that the drone 1a is moving away from the controller 2 even if visibility is poor due to fog, smoke, or the like.

As described above, in the present embodiment, if the drone 1a is moving toward the controller 2, the light emission unit 15 continuously emits laser light, and if the drone 1a is moving away from the controller 2, the light emission unit 15 intermittently emits laser light. As a result, the operator can easily understand which way the drone 1a is moving.

Although whether the drone 1a is moving toward or away from the controller 2 is determined in the present embodiment, the light emission unit 15 may emit laser light differently depending on three or more directions in which the drone 1a is moving.

Figure 9:
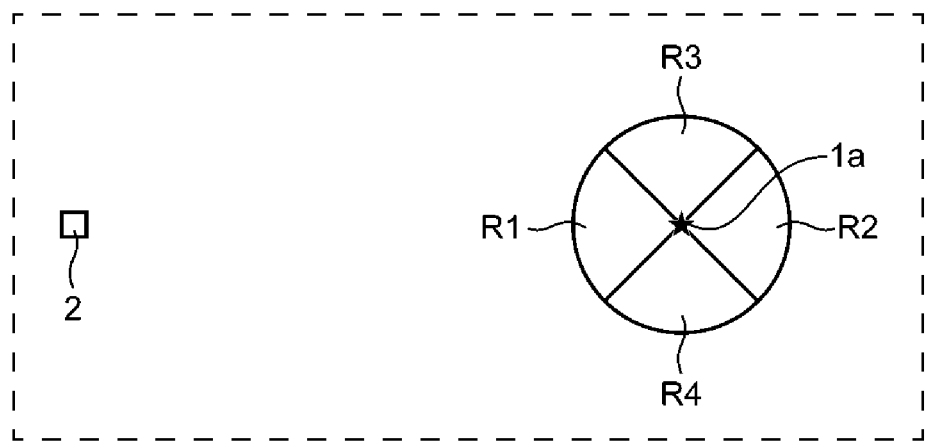
FIG. 9 is a schematic diagram illustrating another example of a setting of how a light emission unit of the drone emits laser light at a time when the controller and the drone illustrated in FIG. 5 are viewed from above.

FIG. 9 is a schematic diagram illustrating another example of a setting of how the light emission unit 15 of the drone 1a emits laser light at a time when the controller 2 and the drone 1a illustrated in FIG. 5 are viewed from above. As illustrated in FIG. 9, when the controller 2 (a hollow square in FIG. 9), that is, the operator, and the drone 1a (a star in FIG. 9) are viewed from above, the drone 1a moves into one of four areas, namely a first area R1, which corresponds to directions in which the drone 1a moves toward the controller 2, a second area R2, which corresponds to directions in which the drone 1a moves away from the controller 2, a third area R3, which corresponds, except for the first and second areas R1 and R2, to left directions when the drone 1a is viewed from the controller 2, that is, the operator, and a fourth area R4, which corresponds to right directions.

In this case, for example, the light emission unit 15 is a laser light emission unit capable of independently emitting red, green, blue, or yellow laser light in an arbitrary direction. The moving direction determination section 24 determines, among the first to fourth areas R1 to R4, which area the drone 1 is moving into on the basis of the drone positional information 34 and the controller positional information 35 stored in the storage unit 17a, and outputs a result of the determination to the light emission control section 23a. The light emission control section 23a controls the light emission unit 15 such that the light emission unit 15 emits, in the controller direction, red laser light if the moving direction determination section 24 determines that the drone 1a is moving into the first area R1, green laser light if the moving direction determination section 24 determines that the drone 1a is moving into the second area R2, blue laser light if the moving direction determination section 24 determines that the drone 1a is moving into the third area R3, and yellow laser light if the moving direction determination section 24 determines that the drone 1a is moving to the fourth area R2.

That is, the light emission unit 15 can emit red laser light if the drone 1a is moving toward the controller 2, green laser light if the drone 1a is moving away from the controller 2, blue laser light if the drone 1a is moving leftward relative to the controller 2, and yellow laser light if the drone 1a is moving rightward relative to the controller 2. As a result, the operator can easily visually observe the drone 1a and specifically understand which way the drone 1a is moving even if visibility is poor due to fog, smoke, or the like.

The emission of laser light performed by the light emission unit 15 is not limited to the above example and may be modified in various ways. For example, other colors may be used or various patterns of blinking of the same color of laser light may be used for the first to fourth areas R1 to R4, instead, in order to allow the operator to understand which area the drone 1a is moving into. The areas into which the drone 1a is moving into, too, are not limited to the above example and may be modified in various ways. For example, the third and fourth areas R3 and R4 may be combined together as a single area and blue laser light may be used, or five or more areas may be provided, instead. The emission of laser light performed by the light emission unit 15 may be set in advance, or may be set by the operator using the controller 2.

Although the light emission unit 15 emits laser light in the above-described manner if the distance between the drone 1a and the controller 2 exceeds the certain value in the present embodiment, the condition under which the light emission unit 15 emits laser light is not limited to this example. The light emission control section 23a may control the light emission unit 15 such that the light emission unit 15 emits laser light differently depending on the distance between the drone 1a and the controller 2, instead.

For example, the light emission control section 23a may control the light emission unit 15 such that the light emission unit 15 emits red laser light if the distance between the drone 1a and the controller 2 is 50 to 100 m, green laser light if the distance is 100 to 150 m, blue laser light if the distance is 150 to 200 m, and yellow laser light if the distance is 200 to 250 m. In this case, the operator can easily understand the distance between the drone 1a and the controller 2.

Third Embodiment

Next, a light emission control system according to a third embodiment of the present disclosure will be described. In the above embodiments, if a drone is located far from an operator, the drone can be visually observed thanks to laser light emitted from the drone toward a controller, but it is difficult to visually observe a condition around the drone. It is desirable for the operator to understand which way the wind is blowing especially around a small drone because such a drone is susceptible to wind. In the present embodiment, therefore, an operator is notified of a wind condition around a drone using laser light emitted from the drone.

Figure 10:
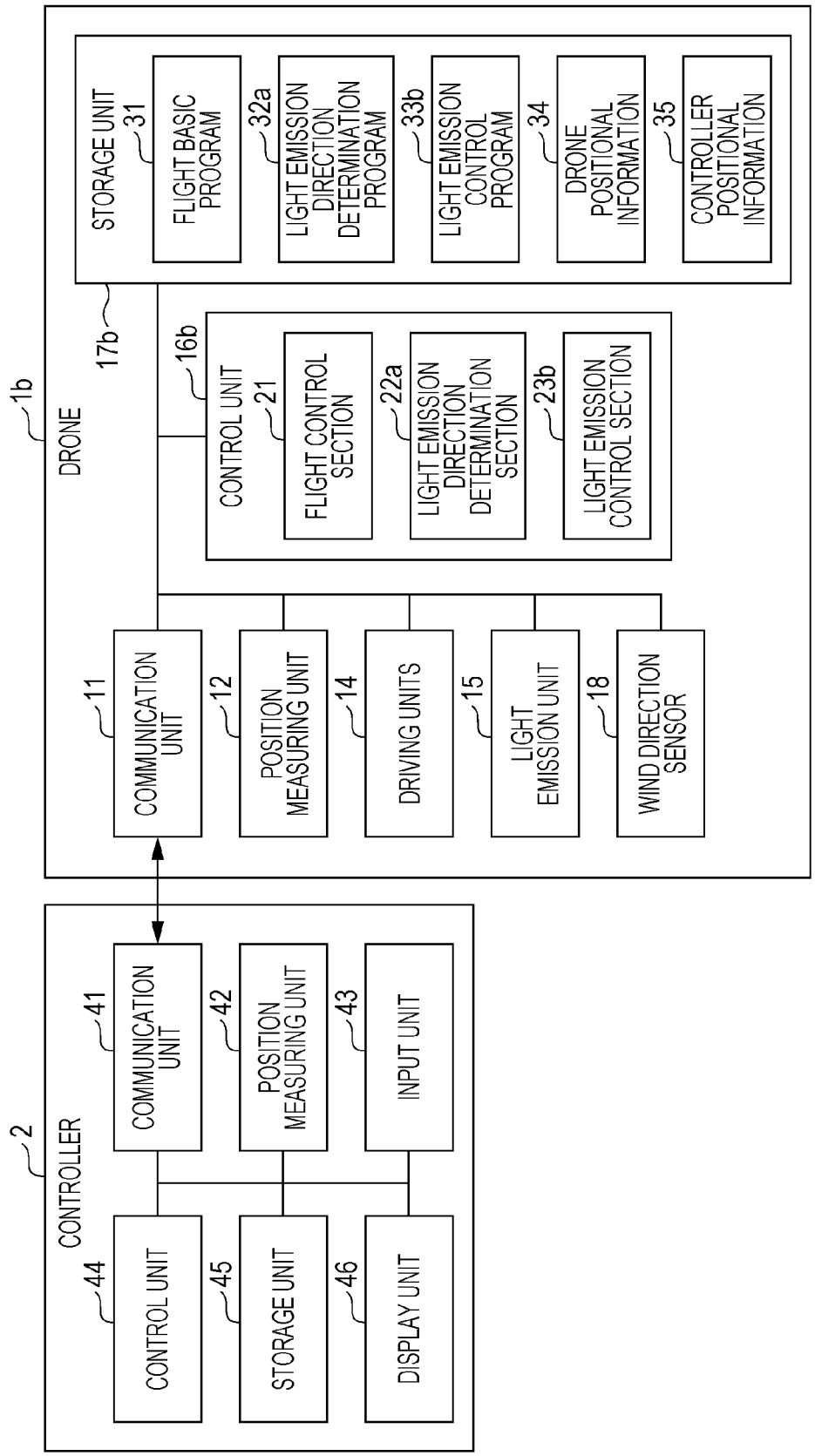
FIG. 10 is a block diagram illustrating an example of the configuration of a light emission control system according to a third embodiment of the present disclosure.

FIG. 10 is a block diagram illustrating an example of the configuration of the light emission control system according to the third embodiment of the present disclosure. The light emission control system illustrated in FIG. 10 includes a drone 1b and the controller 2. The drone 1b includes the communication unit 11, the position measuring unit 12, the driving units 14, the light emission unit 15, a control unit 16b, a storage unit 17b, and a wind direction sensor 18. The control unit 16b includes the flight control section 21, a light emission direction determination section 22a, and a light emission control section 23b. The storage unit 17b stores the flight basic program 31, a light emission direction determination program 32a, a light emission control program 33b, the drone positional information 34, and the controller positional information 35.

The light emission control system illustrated in FIG. 10 is different from the light emission control system illustrated in FIG. 1 in that the inclination measuring unit 13 illustrated in FIG. 1 is omitted, the wind direction sensor 18 is added, the light emission direction determination section 22 and the light emission control section 23 of the control unit 16 are replaced by the light emission direction determination section 22a and the light emission control section 23b of the control unit 16b, respectively, the inclination information 36 stored in the storage unit 17 is omitted, and the light emission direction determination program 32 and the light emission control program 33 stored in the storage unit 17 are replaced by the light emission direction determination program 32a and the light emission control program 33b stored in the storage unit 17b, respectively. The other components are the same as those of the light emission control system illustrated in FIG. 1 and given the same reference numerals, and detailed description thereof is omitted.

The wind direction sensor 18 regularly obtains wind direction information indicating a wind direction around the drone 1b as flight state information regarding a flight state of the drone 1b.

The light emission direction determination section 22a executes the light emission direction determination program 32a stored in the storage unit 17b to calculate a distance between the drone 1b and the controller 2 on the basis of the drone positional information 34 and the controller positional information 35 stored in the storage unit 17b. The light emission direction determination section 22a also functions as a wind direction determination section. The light emission direction determination section 22a determines the wind direction indicated by the wind direction information as a direction in which the light emission unit 15 emits laser light and transmits the direction to the light emission control section 23b.

If the distance between the drone 1b and the controller 2 exceeds a certain value, the light emission control section 23b executes the light emission control program 33b stored in the storage unit 17b to control the light emission unit 15 such that the light emission unit 15 emits laser light in the wind direction determined by the light emission direction determination section 22a. The light emission unit 15 emits laser light in the wind direction.

Figure 11:
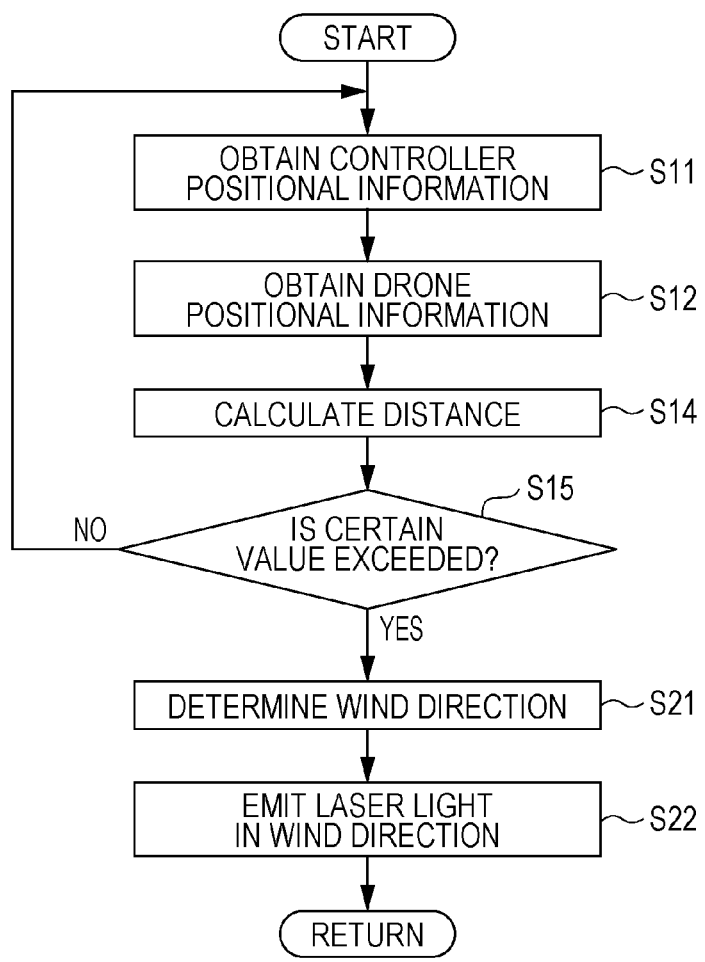
FIG. 11 is a flowchart illustrating an example of a process for controlling emission of light performed by the light emission control system illustrated in FIG. 10.

FIG. 11 is a flowchart illustrating an example of a process for controlling emission of light performed by the light emission control system illustrated in FIG. 10. Processing in steps S11 to S15 illustrated in FIG. 10 is the same as that in steps S11 to S15 illustrated in FIG. 3 and given the same reference numerals, and detailed description thereof is omitted.

If, after the processing in steps S11 to S15 is performed, the distance between the drone 1b and the controller 2 exceeds the certain value (YES in step S15), the light emission direction determination section 22a determines, in step S21, a wind direction indicated by wind direction information transmitted from the wind direction sensor 18 as a direction in which the light emission unit 15 emits laser light and transmits the direction to the light emission control section 23b.

Next, if the distance between the drone 1b and the controller 2 exceeds the certain value, the light emission control section 23b controls, in step S22, the light emission unit 15 such that the light emission unit 15 emits laser light in the wind direction determined by the light emission direction determination section 22a. The light emission unit 15 emits laser light in the wind direction. The process then returns to step S11, and the subsequent processing is performed.

Figure 12:
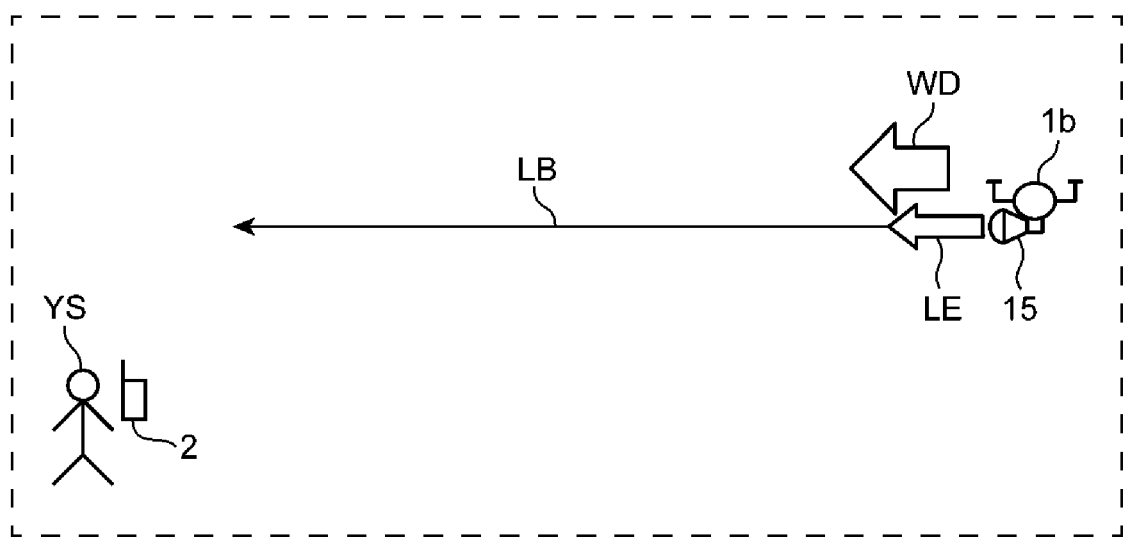
FIG. 12 is a schematic diagram illustrating an example of a use state of the light emission control system illustrated in FIG. 10.

FIG. 12 is a schematic diagram illustrating an example of a use state of the light emission control system illustrated in FIG. 10. As illustrated in FIG. 12, the drone 1b measures the wind direction around the drone 1b using the wind direction sensor 18 and determines a measured wind direction WD as the direction LE in which the light emission unit 15 emits laser light, and the light emission unit 15 emits the laser light LB. With this configuration, the operator YS can easily understand the wind direction around the drone 1b by checking the direction (direction LE) in which laser light is emitted from the drone 1b.

The configuration of the light emission unit 15 is not limited to the above example and may be modified in various ways. For example, in addition to the light emission unit 15 that emits laser light in the wind direction, a separate light emission unit that emits laser light toward the controller 2 from the drone 1b may be provided as in the first or second embodiment.

Alternatively, the light emission unit 15 may emit laser light toward the controller 2 from the drone 1b while emitting laser light in the wind direction. In this case, if the laser light emitted in the wind direction and the laser light emitted toward the controller 2 from the drone 1b are emitted differently, the operator can easily distinguish the two beams of laser light. When the light emission unit 15 can be used for a plurality of purposes like this, the operator may operate the controller 2 to cause the light emission unit 15 to emit laser light for one of the plurality of purposes.

Fourth Embodiment

Next, a light emission control system according to a fourth embodiment of the present disclosure will be described. Since a small drone is susceptible to wind, an operator might want to understand how much the drone is being affected by wind. In the present embodiment, therefore, an operator is notified how much a drone is being affected by wind through laser light emitted from the drone.

Figure 13:
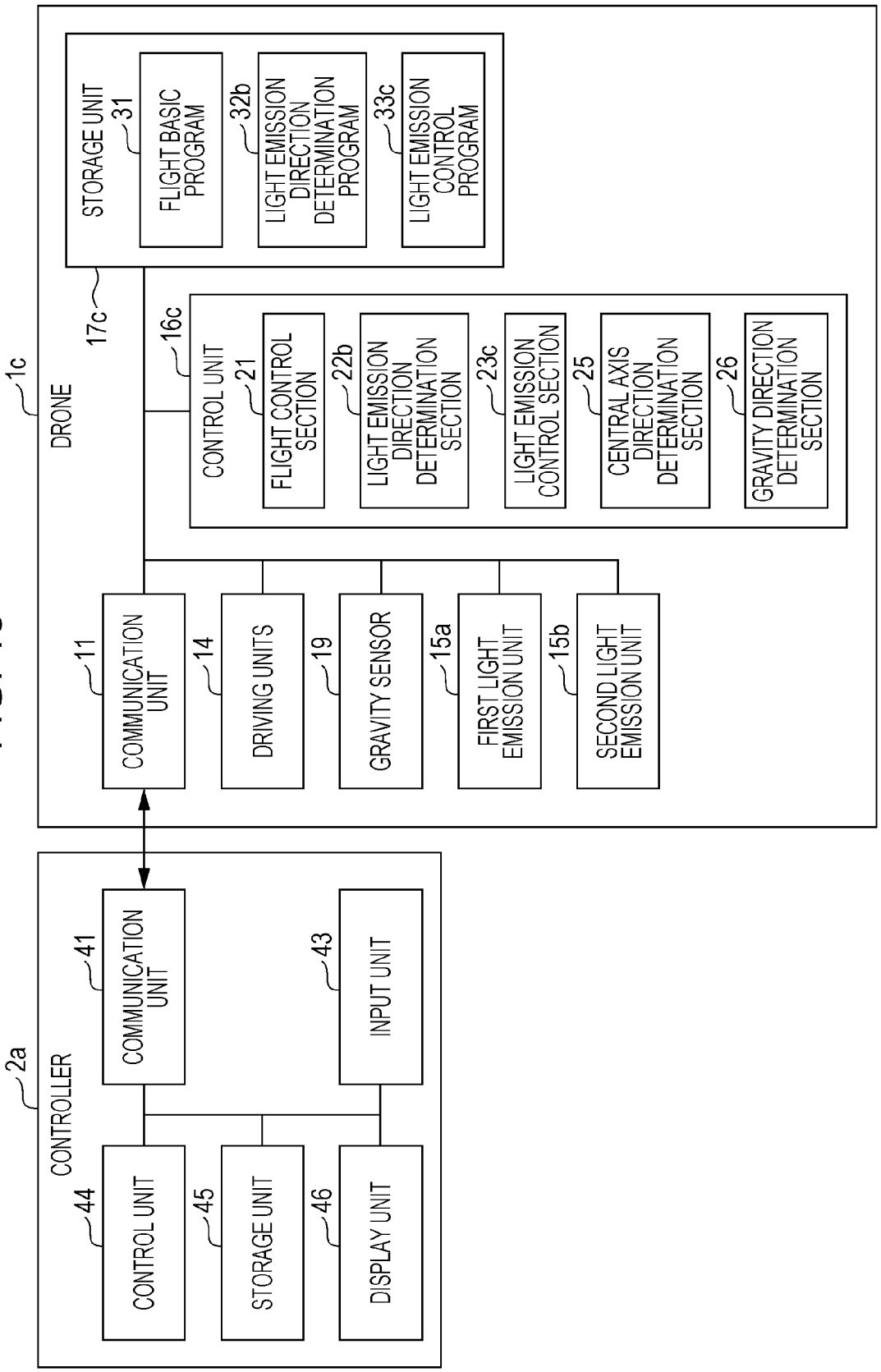
FIG. 13 is a block diagram illustrating an example of the configuration of a light emission control system according to a fourth embodiment of the present disclosure.

FIG. 13 is a block diagram illustrating an example of the configuration of the light emission control system according to the fourth embodiment of the present disclosure. The light emission control system illustrated in FIG. 13 includes a drone 1c and a controller 2a. The controller 2a includes the communication unit 41, the input unit 43, the control unit 44, the storage unit 45, and the display unit 46. The drone 1c includes the communication unit 11, the driving units 14, a first light emission unit 15a, a second light emission unit 15b, a control unit 16c, a storage unit 17c, and a gravity sensor 19. The control unit 16c includes the flight control section 21, a light emission direction determination section 22b, a light emission control section 23c, a central axis direction determination section 25, and a gravity direction determination section 26. The storage unit 17c stores the flight basic program 31, a light emission direction determination program 32b, and a light emission control program 33c.

The light emission control system illustrated in FIG. 13 is different from the light emission control system illustrated in FIG. 1 in that the position measuring unit 42 of the controller 2 and the position measuring unit 12 and the inclination measuring unit 13 of the drone 1 illustrated in FIG. 1 are omitted, the light emission unit 15 is replaced by the first light emission unit 15a and the second light emission unit 15b, the light emission direction determination section 22 and the light emission control section 23 of the control unit 16 are replaced by the light emission direction determination section 22b and the light emission control section 23c of the control unit 16c, respectively, the central axis direction determination section 25 and the gravity direction determination section 26 are added, the drone positional information 34, the controller positional information 35, and the inclination information 36 stored in the storage unit 17 are omitted, and the light emission direction determination program 32 and the light emission control program 33 stored in the storage unit 17 are replaced by the light emission direction determination program 32b and the light emission control program 33c stored in the storage unit 17c, respectively. The other components are the same as those of the light emission control system illustrated in FIG. 1 and given the same reference numerals, and detailed description thereof is omitted.

The input unit 43 of the controller 2a receives, from the operator, a light emission instruction, which is an instruction to cause the drone 1c to emit laser light, and the communication unit 41 transmits the light emission instruction to the communication unit 11 of the drone 1c. The input unit 43 also receives, from the operator, a light emission stop instruction, which is an instruction to cause the drone 1c to stop emitting laser light, and the communication unit 41 transmits the light emission instruction to the communication unit 11 of the drone 1c.

The communication unit 11 of the drone 1c receives a light emission instruction from the controller 2a as instruction information that causes the first and second light emission units 15a and 15b to emit laser light and outputs the light emission instruction to the central axis direction determination section 25 and the gravity direction determination section 26. The communication unit 11 also receives a light emission stop instruction from the controller 2a and outputs the light emission stop instruction to the light emission control section 23c.

The gravity sensor 19 regularly detects a direction of gravity upon the drone 1c, obtains gravity information indicating the detected direction of gravity, and outputs the gravity information to the gravity direction determination section 26.

After receiving a light emission instruction from the controller 2a, the central axis direction determination section 25 determines, on the basis of a current flight state of the drone 1c, which way an upward direction of a central axis of the drone 1c is pointing, and transmits the upward direction of the central axis of the drone 1c to the light emission direction determination section 22b as a central axis direction (body axis direction).

The central axis direction refers, for example, to an upward direction of an axis that passes through the center of gravity of the drone 1c at a horizontal state. When the drone 1c is inclined, the central axis direction is inclined in accordance with the inclination of the drone 1c. When the drone 1c is inclined due to wind, therefore, the central axis direction is inclined, and the operator can understand wind speed and direction by checking which way and how much the central axis direction is inclined.

After receiving a light emission instruction from the controller 2a, the gravity direction determination section 26 determines a direction indicated by gravity information from the gravity sensor 19 as a direction of gravity upon the drone 1c and transmits the direction to the light emission direction determination section 22b as a gravity direction. Although a downward direction of gravity upon the drone 1c is determined as the gravity direction in the present embodiment, an upward direction may be determined as the gravity direction, instead.

Even when the drone 1c is inclined due to wind, the gravity direction remains the same. If the central axis direction and the gravity direction match, the operator can understand that the drone 1c is not inclined, that is, that the drone 1c is not being affected by wind. If the drone 1c is inclined due to wind and the gravity direction and the central axis direction do not match, the operator can easily understand wind speed and direction by checking which way and how much the central axis direction is inclined from the gravity direction.

The light emission direction determination section 22b executes the light emission direction determination program 32b stored in the storage unit 17c to determine the central axis direction transmitted from the central axis direction determination section 25 as a direction in which the first light emission unit 15a emits laser light and the gravity direction transmitted from the gravity direction determination section 26 as a direction in which the second light emission unit 15b emits laser light. The light emission direction determination section 22b then transmits the determined directions to the light emission control section 23c.

The light emission control section 23c executes the light emission control program 33c stored in the storage unit 17c to control the first and second light emission units 15a and 15b such that the first light emission unit 15a emits laser light in the central axis direction and the second light emission unit 15b emits laser light in the gravity direction. As a result, the first light emission unit 15a emits laser light in the central axis direction (the upward direction of the central axis of the drone 1c), and the second light emission unit 15b emits laser light in the gravity direction (ground direction). The first and second light emission units 15a and 15b may emit laser light in various ways insofar as the operator can distinguish the laser light in the central axis direction and the laser light in the gravity direction. For example, the first and second light emission units 15a and 15b may emit laser light of the same color, different colors, or different blinking patterns.

If receiving a light emission stop instruction from the controller 2a, the light emission control section 23c causes the first and second light emission units 15a and 15b to stop emitting laser light.

Figure 14:
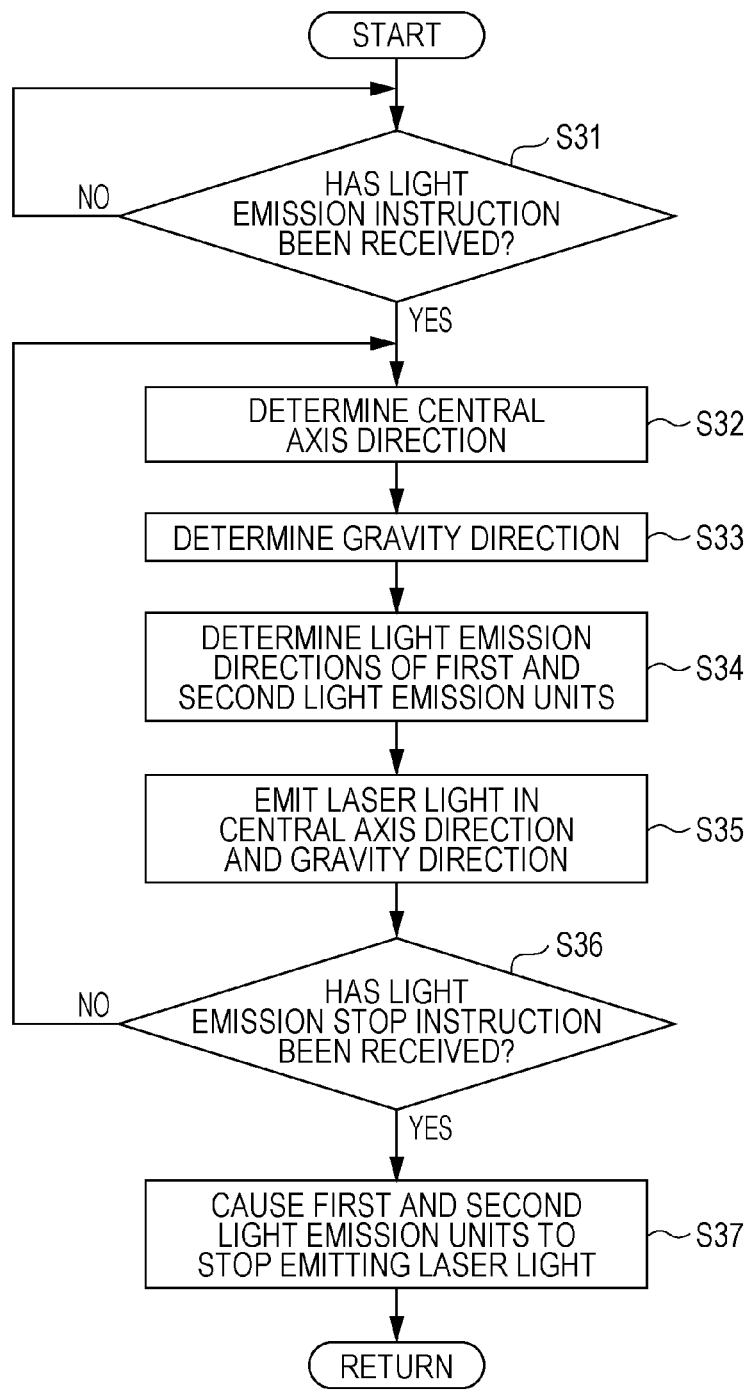
FIG. 14 is a flowchart illustrating an example of a process for controlling emission of light performed by the light emission control system illustrated in FIG. 13.

FIG. 14 is a flowchart illustrating an example of a process for controlling emission of light performed by the light emission control system illustrated in FIG. 13.

First, in step S31, the communication unit 11 of the drone 1c determines whether a light emission instruction has been received from the controller 2a. If a light emission instruction has not been received from the controller 2a (NO in step S31), the communication unit 11 repeats the processing in step S31.

On the other hand, if the operator inputs a light emission instruction to the drone 1c using the input unit 43 of the controller 2a and the communication unit 41 transmits the light emission instruction to the communication unit 11 of the drone 1c, the communication unit 11 receives the light emission instruction from the controller 2a (YES in step S31), and the input unit 43 of the controller 2a transmits the light emission instruction from the controller 2a to the central axis direction determination section 25 and the gravity direction determination section 26. The process proceeds to step S32.

Next, in step S32, the central axis direction determination section 25 determines the upward direction of the central axis of the drone 1c as the central axis direction in accordance with the light emission instruction from the controller 2a and transmits the central axis direction to the light emission direction determination section 22b.

Next, in step S33, the gravity direction determination section 26 determines a direction indicated by gravity information from the gravity sensor 19 as a gravity direction in accordance with the light emission instruction from the controller 2a and transmits the gravity direction to the light emission direction determination section 22b.

Next, in step S34, the light emission direction determination section 22b determines the central axis direction transmitted from the central axis direction determination section 25 as a direction in which the first light emission unit 15a emits laser light and the gravity direction transmitted from the gravity direction determination section 26 as a direction in which the second light emission unit 15b emits laser light and transmits the determined directions to the light emission control section 23c.

Next, in step S35, the light emission control section 23c controls the first and second light emission units 15a and 15b such that the first light emission unit 15a emits laser light in the central axis direction and the second light emission unit 15b emits laser light in the gravity direction. The first light emission unit 15a emits laser light in the central axis direction (the upward direction of the central axis of the drone 1c), and the second light emission unit 15b emits laser light in the gravity direction (ground direction).

Next, in step S36, the communication unit 11 determines whether a light emission stop instruction has been received from the controller 2a. If a light emission stop instruction has not been received from the controller 2a (NO in step S36), the communication unit 11 repeats the processing in step S32 and later, and the first and second light emission units 15a and 15b keep emitting laser light.

On the other hand, if the operator inputs a light emission stop instruction to the drone 1c using the input unit 43 of the controller 2a and the communication unit 41 transmits the light emission stop instruction to the communication unit 11 of the drone 1c, the communication unit 11 receives the light emission stop instruction from the controller 2a (YES in step S36), and the input unit 43 of the controller 2a transmits the light emission stop instruction from the controller 2a to the light emission control section 23c. The process proceeds to step S37.

Next, in step S37, the light emission control section 23c causes the first and second light emission units 15a and 15b to stop emitting laser light. The process then returns to step S31, and the subsequent processing is performed.

Figure 15:
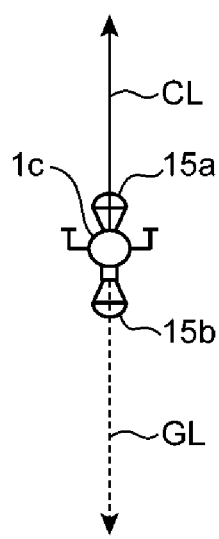
FIG. 15 is a schematic diagram illustrating an example of a use state of the light emission control system illustrated in FIG. 13 at a time when a drone is not being affected by wind.
Figure 16:
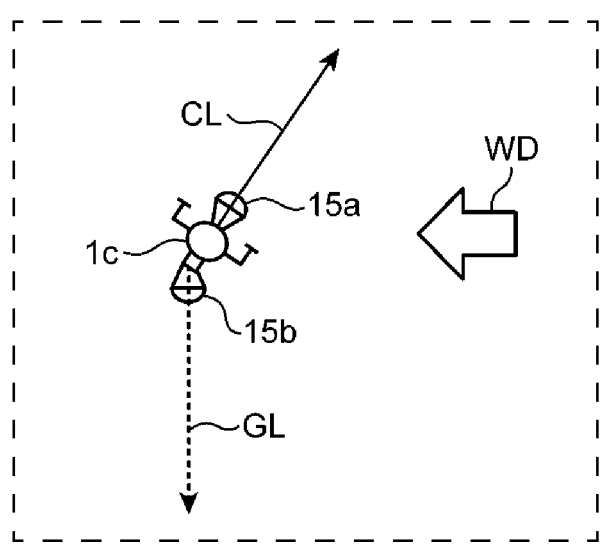
FIG. 16 is a schematic diagram illustrating an example of a use state of the light emission control system illustrated in FIG. 13 at a time when the drone is being affected by wind.

FIG. 15 is a schematic diagram illustrating an example of a use state of the light emission control system illustrated in FIG. 13 at a time when the drone 1c is not being affected by wind. FIG. 16 is a schematic diagram illustrating an example of a use state of the light emission control system illustrated in FIG. 13 at a time when the drone 1c is being affected by wind.

As described above, in the present embodiment, if the drone 1c receives, from the controller 2a, the operator's light emission instruction to cause the first and second light emission units 15a and 15b to emit laser light, the drone 1c emits, in accordance with the received light emission instruction, laser light from the first light emission unit 15a in the central axis direction and from the second light emission unit 15b in the gravity direction.

As illustrated in FIG. 15, therefore, if the drone 1c is not being affected by wind, the first light emission unit 15a of the drone 1c emits laser light CL in the central axis direction, and the second light emission unit 15b emits laser light GL in the gravity direction. In this case, since the laser light CL in the central axis direction and the laser light GL in the gravity direction match, the operator can easily understand that the drone 1c is not being affected by wind even if the operator is located far from the drone 1c.

On the other hand, as illustrated in FIG. 16, if the drone 1c is being affected by wind and the wind is blowing in a direction WD, the first light emission unit 15a of the drone 1c emits the laser light CL in the central axis direction obliquely upward, and the second light emission unit 15b emits the laser light GL in the gravity direction downward. In this case, since the laser light CL in the central axis direction and the laser light GL in the gravity direction do not match, the operator can easily understand which way and how strongly the wind is blowing on the basis of which way and how much the laser light LC in the central axis direction is inclined relative to the laser light GL in the gravity direction, even if the operator is located far from the drone 1c.

Although laser light is emitted in the central axis direction and the gravity direction in the present embodiment, directions in which laser light is emitted are not limited to this example. Laser light may be emitted only in the central axis direction, instead, and in this case, too, the operator can understand which way and how strongly wind is blowing. In this modification of the light emission control system, for example, the second light emission unit 15b, the gravity sensor 19, and the gravity direction determination section 26 are omitted from the drone 1c illustrated in FIG. 13, and the light emission direction determination section 22b determines a central axis direction transmitted from the central axis direction determination section 25 as a direction in which the first light emission unit 15a emits laser light. The light emission control section 23c controls the first light emission unit 15a such that the first light emission unit 15a emits laser light in the central axis direction, and the first light emission unit 15a emits laser light only in the central axis direction of the drone 1c as described hereinafter.

Figure 17:
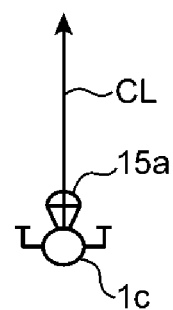
FIG. 17 is a schematic diagram illustrating an example of a use state of a modification of the light emission control system illustrated in FIG. 13 at a time when the drone is not being affected by wind.
Figure 18:
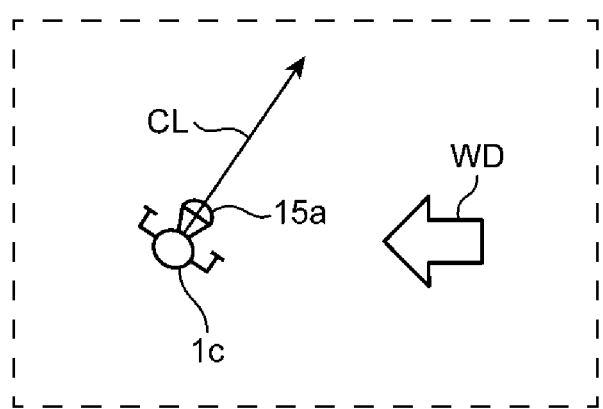
FIG. 18 is a schematic diagram illustrating an example of a use state of the modification of the light emission control system illustrated in FIG. 13 at a time when the drone is being affected by wind.

FIG. 17 is a schematic diagram illustrating an example of a use state of the modification of the light emission control system illustrated in FIG. 13 at a time when the drone 1c is not being affected by wind. FIG. 18 is a schematic diagram illustrating an example of a use state of the modification of the light emission control system illustrated in FIG. 13 at a time when the drone 1c is being affected by wind.

As described above, in the present modification, if the drone 1c receives, from the controller 2a, the operator's light emission instruction to cause the first light emission unit 15a of the drone 1c to emit laser light, the drone 1c emits, in accordance with the received light emission instruction, laser light from the first light emission unit 15a in the central axis direction.

As illustrated in FIG. 17, therefore, if the drone 1c is not being affected by wind, the first light emission unit 15a of the drone 1c emits the laser light CL in the central axis direction vertically upward. The operator, therefore, can easily understand that the drone 1c is not being affected by wind.

On the other hand, as illustrated in FIG. 18, if the drone 1c is being affected by wind and the wind is blowing in the direction WD, the first light emission unit 15a of the drone 1c emits the laser light CL in the central axis direction obliquely upward. The operator can therefore easily understand which way and how strongly the wind is blowing on the basis of which way and how much the laser light CL in the central axis direction is inclined.

Although the position measuring units 42 and 12 are omitted from the controller 2a and the drone 1c, respectively, in the present embodiment, the configuration of the controller 2a and the drone 1c is not limited to this example. As in the first embodiment or the like, the position measuring units 42 and 12 may be provided for the controller 2a and the drone 1c, respectively, and laser light may also be emitted in the controller direction, instead. Although laser light is emitted in accordance with a light emission instruction from the operator in the present embodiment, a timing at which laser light is emitted is not limited to this example. As in the first embodiment or the like, the inclination measuring unit 13 may be added, and laser light may be emitted if the inclination of the drone 1c measured by the inclination measuring unit 13 exceeds a certain value, instead.

In the present disclosure, all or a part of the units, the apparatuses, the members, and the sections or all or a part of the function blocks illustrated in the block diagrams of FIGS. 1, 5, 10, and 13 may be implemented by one or a plurality of electronic circuits including a semiconductor device, a semiconductor integrated circuit (IC), or a large-scale integration (LSI) circuit. The LSI circuit or the IC may be integrated on a single chip, or may be achieved by a plurality of chips. For example, the function blocks other than the storage devices may be integrated on a single chip.

Although the terms "LSI" and "IC" are used here, a term "system LSI", "very-large-scale integration (VLSI)", or "ultra-large-scale integration (ULSI)" may be used, instead, depending on a degree of integration. A field-programmable gate array (FPGA), which can be programmed after an LSI circuit is fabricated, or a reconfigurable logic device, in which connections inside an LSI circuit can be reconfigured or circuit sections inside the LSI circuit can be set up, may be used for the same purpose.

Furthermore, all or a part of the functions and operations of the units, the apparatuses, the members, and the sections may be achieved by a software process. In this case, software is stored in a non-transitory recording medium such as a read-only memory (ROM), an optical disc, or a hard disk drive, and functions specified in the software are executed by a processor and peripheral devices when the software is executed by the processor. A system or an apparatus may include one or a plurality of non-transitory recording media storing the software, the processor, and a necessary hardware device, such as an interface.

The light emission control apparatus, the drone, and the method for controlling emission of light can enable an operator to visually observe a flight state of the drone even if the drone is located far from the operator and are effective as a light emission control apparatus, a drone, and a method for controlling emission of light that control a light emission unit used in the drone that flies in accordance with remote control performed using a controller.

What is claimed is:

1. An apparatus comprising:
one or a plurality of memories; and
circuitry which, in operation,
obtains flight state information regarding a flight state of a drone that flies in accordance with remote control performed using a controller, the drone being provided with a first light emitter and a second light emitter,
determines, on the basis of the flight state information, a first direction in which the first light emitter emits light and a second direction in which the second light emitter emits light,
controls the light emitters such that the first light emitter emits light in the first direction and the second light emitter emits light in the second direction,
obtains wind direction information indicating a wind direction around the drone and determines the wind direction around the drone as the first direction in which the first light emitter emits light, and
obtains a direction of the controller relative to the drone, and determines the direction of the controller as the second direction in which the second light emitter emits light, wherein the second light emitter is different than the first light emitter,
wherein the circuitry controls the first light emitter and the second light emitter such that emitted light towards the direction of the controller is different in blinking patterns of the same color than emitted light towards the wind direction.

2. An apparatus comprising:
one or a plurality of memories; and
circuitry which, in operation,
obtains flight state information regarding a flight state of a drone that flies in accordance with remote control performed using a controller, the drone being provided with a first light emitter and a second light emitter,
determines, on the basis of the flight state information, a first direction in which the first light emitter emits light and a second direction in which the second light emitter emits light,
controls the light emitters such that the first light emitter emits light in the first direction and the second light emitter emits light in the second direction,
obtains instruction information for instructing the first light emitter to emit light in a direction of a central axis of the drone during flight and determines, on the basis of the instruction information, an upward direction of the central axis as the first direction in which the first light emitter emits light, and
controls the second light emitter such that the second light emitter emits light in a gravity direction, wherein the second light emitter is different than the first light emitter;
wherein the circuitry controls the first light emitter and the second light emitter such that emitted light in the upward direction of the central axis and emitted light in the gravity direction are different in blinking patterns of the same color.

3. The apparatus according to claim 2, wherein the circuitry obtains gravity information indicating the gravity direction upon the drone, determines, on the basis of the instruction information, the upward direction of the central axis as the direction in which the first light emitter emits light and the gravity direction indicated by the gravity information as the direction in which the second light emitter emits light, and controls the first and second light emitters such that the first light emitter emits light in the upward direction of the central axis and the second light emitter emits light in the gravity direction.

* * * * *